No. 844,643. PATENTED FEB. 19, 1907.
F. W. ZOLLERS.
NUT LOCK.
APPLICATION FILED NOV. 30, 1906.
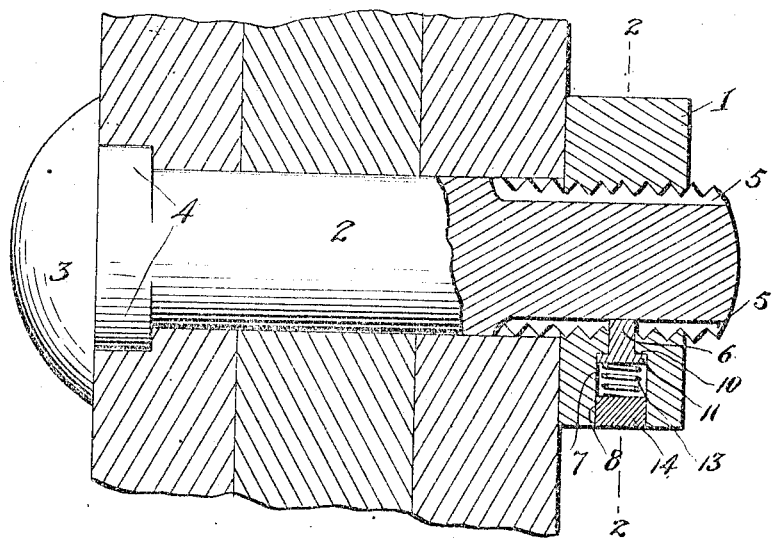
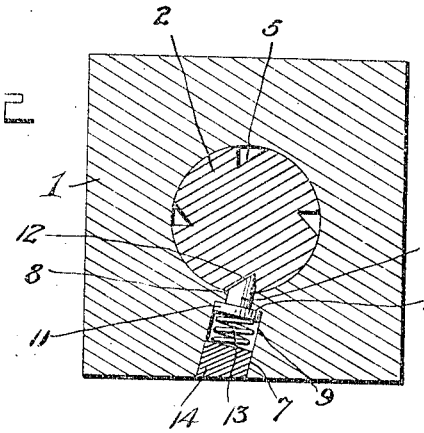
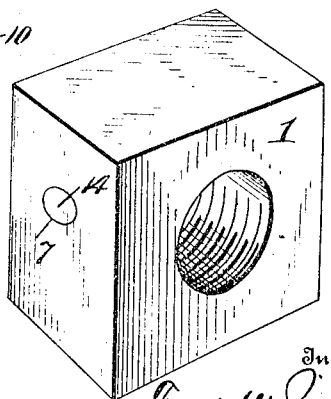
Witnesses
Inventor
Frank W. Zollers
By Watson E. Coleman
Attorney

UNITED STATES PATENT OFFICE.

FRANK W. ZOLLERS, OF COULTERS, PENNSYLVANIA.

NUT-LOCK.

No. 844,643.

Specification of Letters Patent.

Patented Feb. 19, 1907.

Application filed November 30, 1906. Serial No. 345,831.

*To all whom it may concern:*

Be it known that I, FRANK W. ZOLLERS, a citizen of the United States, residing at Coulters, in the county of Allegheny and State of Pennsylvania, have invented certain new and useful Improvements in Nut-Locks, of which the following is a specification, reference being had therein to the accompanying drawings.

My invention relates to improvements in nut-locks, and more particularly to those by means of which the nut is locked upon the bolt.

The object of the invention is to provide a device of this character which will be of simple construction, so that it may be manufactured at a small cost, which will be durable in use and effective in accomplishing its purpose, and which may be readily unlocked when it is desired to remove the nut from the bolt.

The above and other objects are accomplished by the improved construction shown in the accompanying drawings, in which—

Figure 1 is a longitudinal section through the threaded end of a bolt and my improved nut-locking means. Fig. 2 is a transverse section taken on the plane indicated by the line 2 2 in Fig. 1, and Fig. 3 is a perspective view of the nut removed from the bolt.

In the drawings the numeral 1 denotes a nut of any suitable form and construction which is locked upon a bolt 2 in accordance with my invention. This bolt may also be of any suitable form and construction; but, as shown, it has screw-threads at one of its ends and a head 3 at its opposite end. The bolt 2 is preferably formed with the usual laterally-projecting enlargements 4 adjacent to the head 3, so that the bolt will be prevented from rotating in the object or objects through which it passes.

In the practice of my invention I form in the threaded end of the bolt 2 one or more longitudinally-extending grooves 5, which are preferably V-shaped in cross-section, as shown in Fig. 2, and which are adapted to be engaged by a spring pawl or dog 6, which is arranged in a cavity 7 in the nut 1. This cavity 7 is preferably arranged at a slight angle with respect to the face of the nut upon which it opens, and its inner end 8, which latter opens into the threaded aperture in the nut, is of less width than that of its outer end or portion 9. This reduction in the size of the cavity provides an annular shoulder 10, adapted to be engaged by an annular flange 11, formed upon the outer end of the dog 6. The latter corresponds in shape to that of the reduced inner portion 8 of the cavity, in which portion it slides, and its flange or head 11 corresponds in diameter to that of the outer portion 9 of said cavity. The dog 6 is square or of polygonal shape in cross-section, so that it will not rotate; but any other means may be provided for accomplishing the same purpose. The inner end of the dog 6 is tapered or beveled, as shown at 12, so as to fit the V-shaped grooves 5 in the bolt.

It will be noted upon reference to Fig. 2 that one wall of each of the grooves 5 is radially disposed and that its opposite wall is inclined in the direction of the turns of the threads of the bolt, so that as the nut is screwed upon the bolt said inclined walls of the grooves will successively engage the beveled end of the dog and force it outwardly and that when the nut is turned in the reverse direction to unscrew it from the bolt the radial or vertical wall of one of the grooves will engage the dog, and thus prevent rotation of the nut in that direction. The dog is forced inwardly into the grooves by a coil-spring 13, arranged in the large portion 9 of the cavity 7 between the outer end or head 11 of the dog and a plug 14, of soft metal, which is inserted in the outer end of the cavity 7. This plug 14 not only closes the outer end of the cavity, and thus protects the spring and the pawl from moisture, but also holds the parts in their proper positions.

From the foregoing it will be observed that this improved nut-lock may be produced at a comparatively small cost. The grooves may be easily and inexpensively cut or otherwise formed in the bolt, and the cavity may be similarly provided in the nut. The dog and spring may be easily inserted in the cavity and the latter then closed by the plug 14, of lead or other soft metal. The dog 6 will allow the nut to be turned upon the bolt until it is tight thereon, and it will also allow it to be retightened from time to time; but as soon as the nut is turned in the reverse direction said dog will prevent this rotation. Should it be desired to remove the nut, the plug 14 may be readily removed from the cavity, so that the spring and dog will drop out of the same, and thus free the nut.

Having thus described my invention, what

I claim as new, and desire to secure by Letters Patent of the United States, is—

The combination with a bolt having a threaded end formed with an annular series of longitudinally-extending grooves, each of the latter having a radially-extending wall and an inclined wall, of a nut formed with an angularly-disposed, transversely-extending cavity having an enlarged cylindrical outer portion opening upon one of the side faces of the nut and a reduced inner portion opening into the threaded aperture in said nut, the enlarged outer portion of said cavity forming an annular shoulder therein, a dog slidably mounted in the reduced inner portion of said cavity and having a beveled inner end to enter the grooves in said bolt, the outer end of said dog being formed with an annular flange corresponding in diameter to that of the outer portion of said cavity in which it is adapted to slide, a coil-spring arranged in the large outer portion of said cavity and engaged with the outer end of said dog for forcing the latter inwardly and holding its flange upon the annular shoulder in said cavity, and a plug of soft metal driven into the enlarged outer end of said cavity and engaged with the outer end of said spring to retain the same therein and to effectively seal said cavity, substantially as shown and described.

In testimony whereof I hereunto affix my signature in presence of two witnesses.

FRANK W. ZOLLERS.

Witnesses:
ALBERT . DREER,
CHARLES OORE.